Patented Mar. 30, 1954

2,673,788

UNITED STATES PATENT OFFICE 2,673,788

PROCESS FOR PREPARING HYDROGEN CHLORIDE AND COMPOSITION FOR PREPARING IT

Harold Randolph Chipman, Elmira, Ontario, Canada, assignor to United States Rubber Company, New York, N. Y., a corporation of New Jersey No Drawing. Application January 21, 1953, Serial No. 332,498

18 Claims. (Cl. 23—154)

This invention relates to an improved method for storing hydrogen chloride and for generating anhydrous hydrogen chloride as desired. More particularly this invention relates to a simple, convenient and commercially feasible method whereby by-product hydrogen chloride from the chlorination of hydrocarbons or phenol, or any other process attended by the formation of by-product hydrogen chloride, can be recovered in a form in which it can be shipped, stored and handled, and whereby the hydrogen chloride can be subsequently regenerated in pure dry form at any desired time or place. The invention is also concerned with the material, from which hydrogen chloride can thus be regenerated, as a new composition of matter.

Many methods of producing anhydrous hydrogen chloride and storing hydrogen chloride are reported in the literature. German Patent 557,886 describes a method of adding hydrogen chloride to copper sulfate and storing the compound until desired for use, at which time the hydrogen chloride is regenerated by heating the copper sulfate-hydrogen chloride addition compound. U. S. Patent 2,356,334 describes a means based upon anhydrous copper sulfate for storing hydrogen chloride and regenerating it at will. U. S. Patent 2,367,301 describes a method of producing anhydrous hydrogen chloride by dehydrating aqueous hydrochloric acid with concentrated sulfuric acid. Many other methods of storing and generating hydrogen chloride in dry form are reported. However, generally speaking, the previously available methods have been unduly complicated, inconvenient, or expensive to install, use and maintain. My invention has for its objective to make available to the art a method for the recovery, storage and regeneration in anhydrous form of hydrogen chloride, which is not subject to the disadvantages of previous proposals.

My invention is based upon the discovery that hydrogen chloride can be readily stored, shipped and handled by combining it with a tertiary olefin to form the corresponding tertiary alkyl chloride, and that the hydrogen chloride can be regenerated at will in anhydrous form by simply heating a mixture of the tertiary alkyl chloride and an alkyl aryl sulfonic acid catalyst at a temperature sufficiently elevated to effect decomposition of the tertiary alkyl chloride to a mixture of free hydrogen chloride and the tertiary olefin corresponding to the tertiary alkyl chloride. The hydrogen chloride which is thus regenerated in anhydrous form is readily separated from the regenerated tertiary olefin and is put to any desired use.

My invention contemplates the absorption of the by-product hydrogen chloride in any available hydrogen chloride-containing stream. The absorption is effected in a tertiary olefin, especially diisobutylene, using an alkyl aryl sulfonic acid as a catalyst for the absorption. The absorption is the result of chemical reaction of the hydrogen chloride with the tertiary olefin to form the corresponding tertiary alkyl chloride. The resulting tertiary alkyl chloride, with or without neutralization of the catalyst and separation thereof, can be kept indefinitely, and the combined hydrogen chloride contained therein can be desorbed therefrom at any subsequent time by merely heating the tertiary alkyl chloride in admixture with an alkyl aryl sulfonic acid catalyst at a temperature sufficiently high to decompose the alkyl chloride and reform the hydrogen chloride and the corresponding tertiary olefin in free or uncombined state. If desired, the alkyl aryl sulfonic acid employed as the catalyst for the absorption can be left in admixture with the tertiary alkyl chloride until desorption is performed, in which case the same sulfonic acid serves as catalyst in both the absorption and the desorption. In most cases, however, the catalyst used in the absorption will be neutralized with any suitable base, preferably with an organic base such as an organic amine. In many cases the tertiary alkyl chloride will be separated from the neutralized mixture in any suitable manner typically by distillation. If the catalyst is neutralized it will of course subsequently be necessary to provide sulfonic acid catalyst when it is desired to desorb the hydrogen chloride from the tertiary alkyl chloride. In place of adding fresh catalyst for the purpose of regenerating the hydrogen chloride, I may instead add a suitable acid, such as sulfuric acid or hydrochloric acid, to reactivate the previously neutralized catalyst already present in the mixture.

Various methods of effecting the desorption of the hydrogen chloride from the tertiary alkyl chloride in the presence of the alkyl aryl sulfonic acid can be used. I have found that good results are achieved by simply heating the mixture of the alkyl chloride and the catalyst to a temperature sufficiently high to decompose the alkyl chloride and simultaneously passing an inert gas, preferably of a non-condensible nature, such as air, nitrogen, flue gas, carbon dioxide, carbon monoxide, etc., through the heated liquid mixture of the tertiary alkyl chloride and the alkyl aryl sulfonic acid catalyst. The inert gas should of course preferably be anhydrous to avoid contaminating the liberated hydrogen chloride with water. In carrying out this type of regeneration, I prefer to heat the mixture undergoing desorption to a temperature substantially below the boiling point of the tertiary olefin corresponding to the alkyl chloride so that an objectionable proportion of the olefin will not be lost by volatilization into the inert gas passing through the system. For example, when hydrogen chloride is being desorbed from 2-chloro 2,4,4-trimethylpentane, I prefer to heat the mixture of this alkyl chloride with the sulfonic acid catalyst at approximately 75–80° C. which is considerably below the boiling point of diisobutylene (around 102° C. at atmospheric pressure). In such case the gaseous stream leaving the system will consist essentially of the inert gas and the evolved anhydrous hydrogen chloride. This gaseous mixture is suitable for use as a source of anhydrous hydrogen chloride in virtually any chemical process requiring anhydrous hydrogen chloride.

Another method of effecting desorption of the hydrogen chloride in anhydrous form from the tertiary alkyl chloride involves heating the mixture of tertiary alkyl chloride and catalyst at a temperature sufficiently high to decompose the alkyl chloride into its components and distill the regenerated tertiary olefin in admixture with the regenerated hydrogen chloride as the overhead vapors. The tertiary olefin is then condensed from the overhead vapors in any obvious manner, as by passage through a cooled receiver. The residual gaseous hydrogen chloride fraction which will consist of pure anhydrous hydrogen chloride in admixture with traces of tertiary olefin can then be passed through a suitable scrubber where it is contacted with concentrated sulfuric acid, for example, to remove traces of olefin and thus produce an essentially pure dry hydrogen chloride.

For both types of desorption described above I prefer to employ a tertiary olefin which is relatively non-volatile at atmospheric or moderately elevated temperatures. The high volatility of isobutylene practically precludes its use in the method of my invention. Similarly the high volatility of the tertiary pentenes rules them out in a practical sense because of excessive loss of pentenes in the absorption and desorption steps. I prefer to employ a tertiary olefin having at least 6 carbon atoms per molecule. I can use any of the tertiary hexylenes, heptylenes, octylenes, nonylenes, decylenes, dodecylenes, etc. Generally speaking, the tertiary olefin will contain from 6 to 12 carbon atoms per molecule. I especially prefer to employ the tertiary octylenes, particularly those that are known as diisobutylene. The term diisobutylene is used to denote either 2,4,4-trimethylpentene-1 or 2,4,4-trimethylpentene-2 or mixtures of these two isomeric olefins. Diisobutylene, which is made by dimerizing isobutylene, is cheap and readily available and is sufficiently low in volatility to lend itself well to use in my absorption and desorption steps. The diisobutylene of commerce is a mixture of 80% 2,4,4-trimethylpentene-1 and 20% 2,4,4-trimethylpentene-2.

The tertiary alkyl chloride can be prepared as such using the alkyl aryl sulfonic acid at room temperatures or only moderately elevated temperatures, e. g., 25–40° C., and stored in the unneutralized state, i. e., with the catalyst still in admixture with it, at temperatures of the order of 15–20° C., then transported wherever desired, the hydrogen chloride generated therefrom by desorption as in the ways indicated above, and the tertiary olefin returned for re-use for absorption of more hydrogen chloride. The losses of tertiary olefin due to polymerization are minimized by the use of the alkyl aryl sulfonic acid catalyst which appears to have a very mild or no effect on polymerization of the olefin. The tertiary olefin can be re-used so that the only losses are mechanical in nature or are due to entrainment or vaporization loss in the regenerated hydrogen chloride.

The alkyl aryl sulfonic acid used preferably contains at least 10 carbon atoms in the alkyl side chain. Preferably the alkyl side chain is derived from relatively long, straight chain or branched chain, paraffin hydrocarbons especially kerosene. The aryl group is derived from aromatic hydrocarbons typified by benzene, toluene, xylene or naphthalene. Typical sulfonic acids used as catalysts are keryl benzene sulfonic acid, keryl toluene sulfonic acid, keryl xylene sulfonic acid and keryl naphthalene sulfonic acid. As is well-known in the art, the term "keryl" denotes a mixture of alkyl side chains of length ranging from $C_{12}$ to $C_{16}$ and derived from commercial tetrapropylene or a highly saturated kerosene of paraffinic nature. Keryl benzene is made by chlorinating such a kerosene to produce predominantly the monochlorinated product which is then condensed with benzene in a typical Friedel-Crafts reaction using aluminum chloride as the catalyst. The average molecular weight of keryl benzene is 260–270.

The reaction of hydrogen chloride with tertiary olefins in the presence of an alkyl aryl sulfonic acid catalyst is the subject matter of my copending application Serial No. 332,497, filed of even date herewith, to which reference is directed for further details of the absorption step of the present invention.

The absorption is carried out by simply passing the gaseous hydrogen chloride-containing stream through the liquid mixture of the tertiary olefin and the sulfonic acid catalyst, using any suitable type of equipment, such as ordinary gas scrubbing equipment or any other gas-liquid contacting apparatus. The temperature of absorption preferably ranges from 25 to 40° C.

The catalyst is highly effective and need be used only in very small amounts, either in the absorption step or in the desorption step. For most purposes, from 1% to 10% by weight of catalyst is satisfactory, but I more commonly use from 1 to 6%.

My invention possesses many advantages over the prior art. An important advantage is that simple equipment can be used for storing the hydrogen chloride and for forming the tertiary alkyl chloride. The tertiary alkyl chloride can be stored at ordinary pressures so that the use of pressure equipment is avoided. The hydrogen chloride contained therein can be regenerated for any desired use by simply adding small concentrations of alkyl aryl sulfonic acid and heating the resulting mixture to a suitably elevated temperature. The temperature used in desorption can be considerably lower if an inert gas is bubbled through the mixture undergoing desorption than is the case where desorption is effected by distilling the olefin in admixture with the hydrogen chloride from the mixture of alkyl chloride and catalyst. When diisobutylene is used as the olefin for storing the hydrogen chloride, the pure 2-chloro 2,4,4-trimethylpentane containing 24–25% available hydrogen chloride is readily prepared. The hydrogen chloride is regenerated under controlled conditions either by passing the inert gas into the sulfonic acid-catalyst mixture or by heating to higher temperatures without the introduction of such inert gas.

My invention is based upon the discovery that when mixtures of the tertiary alkyl chloride and the alkyl aryl sulfonic acid catalyst are heated, the hydrogen chloride gas is evolved smoothly and in pure anhydrous form and the tertiary olefin is recovered in almost theoretical amounts. The tertiary olefins readily add hydrogen chloride under the conditions of the absorption and readily release it at moderately elevated temperatures in the desorption step. My invention is also based upon the observation that the tertiary olefin regenerated in the desorption step does not polymerize under the conditions of desorption and can be re-used for the absorption of more hydrogen chloride.

As an example of the amount of hydrogen chloride which can be stored in accordance with my invention, an average tank car of 6,700 Imperial gallon capacity can be used to store 16,000 pounds of available hydrogen chloride which can be regenerated in the desired quantities.

In a typical embodiment of my invention, by-product hydrogen chloride from the chlorination of phenol, or from any other suitable source, is bubbled into diisobutylene with which is admixed 2% of its weight of keryl benzene sulfonic acid. The addition of hydrogen chloride takes place immediately with the evolution of heat which can be controlled easily by external cooling. The addition of hydrogen chloride is continued until the absorptive capacity of the diisobutylene has been substantially used up. This point is easily noted because it is the point at which the specific gravity of the mixture is approximately 0.869 at 32° C. The reaction mixture is stored at room temperature until regeneration of the hydrogen chloride is required. The chloro compound can be neutralized with an organic amine in amount sufficient to completely neutralize the catalyst and then distilled under reduced pressure to take the tertiary alkyl chloride overhead. Alternatively, the unneutralized mixture can be simply kept in that condition until regeneration of the hydrogen chloride. The chloro compound should be stored in rubber-lined or glass-lined tanks because hydrogen chloride could be easily released in contact with metal surfaces.

When it is desired to regenerate the hydrogen chloride, the chloro compound is added to a generating vessel and a small amount of keryl benzene sulfonic acid is added to the agitated mixture, which is then heated to regenerate the diisobutylene and the hydrogen chloride.

The invention therefore affords an opportunity to store, ship and market to the ultimate consumer, hydrogen chloride in a combined liquid form, from which liquid the desired gaseous hydrogen chloride can easily be regenerated at will. The marketed product has the form of the described chloro addition compound, preferably containing the neutralized catalyst in the form of an organic amine salt of the catalyst. Simple addition of acid reactivates the catalyst, and the product is ready for regeneration of the hydrogen chloride which it contains.

The following examples illustrate my invention in more detail.

Example 1

Diisobutylene (474.4 grams or 4.2 moles) was added to a one litre three-necked flask provided with a hydrogen chloride inlet, a thermometer, and an agitator. Keryl benzene sulfonic acid (9.5 grams) was added to the diisobutylene with good agitation. Complete solution resulted, giving a black-colored liquid. No evolution of heat was noted at this point.

Hydrogen chloride gas obtained from the chlorination of phenol was bubbled into the diisobutylene-catalyst mixture at the rate of 2.7 grams per minute. A rise in temperature was indicated and the reaction mixture was maintained at a temperature of from 28° to 38° C. A gain in weight of 75 grams per hour, or 1.25 gram per minute, was noted. After two hours, 153.3 grams (4.2 moles) of hydrogen chloride had been added. The specific gravity of the mixture at this point was 0.863 at 32° C.

One hundred and forty-eight grams of the crude unneutralized chloro compound was added to a 500 cc. flask provided with a side-arm leading to a condenser and receiver. The outlet of the receiver was connected to a sulfuric acid scrubber and this scrubber was in turn connected to a caustic absorber to collect the released hydrogen chloride. Heat was applied to the flask to bring the material to the boiling point, and the mixture was then distilled. One hundred and five grams of diisobutylene were collected in the receiver. Thirty-two grams of dry hydrogen chloride were collected in the caustic absorber as indicated by the gain in weight thereof.

Example 2

Hydrogen chloride was added to a diisobutylene-catalyst reaction mixture as in Example 1, after which the crude reaction mixture was neutralized with 2 grams of triethylamine. The specific gravity of the neutralized mixture was 0.876 at 15° C. The neutralized reaction mixture was then placed in a distillation flask and distilled therein under reduced pressure. The fraction boiling at 40° C. at 13 millimeters' pressure was collected. This fraction was almost pure 2 - chloro 2,4,4 - trimethylpentane and weighed 585 grams, corresponding to a 93% yield of the purified product. One hundred and forty-eight grams of the pure compound was added to a 500 cc. flask provided with a side arm leading to a receiver and scrubbers as in Example 1. Three grams of keryl benzene sulfonic acid was added, and the mixture was heated to boiling to drive off the liberated hydrogen chloride gas. About 100 grams of diisobutylene collected in the receiver. The gain in weight of the caustic absorber indicated an evolution of from 33 to 35 grams of hydrogen chloride per mole of the chloro compound. The recovered diisobutylene, after addition of keryl sulfonic acid catalyst, was re-used to absorb and store more hydrogen chloride.

Having thus described my invention, what I claim and desire to protect by Letters Patent is:

1. The method which comprises heating a mixture of a tertiary alkyl chloride and an alkyl aryl sulfonic acid catalyst at a temperature sufficiently elevated to effect decomposition of said alkyl chloride to form free hydrogen chloride and the tertiary olefin corresponding to said alkyl chloride, and separating said hydrogen chloride from said olefin.

2. The method which comprises heating a mixture of a tertiary alkyl chloride and an alkyl aryl sulfonic acid catalyst at a temperature sufficiently elevated to effect decomposition of said alkyl chloride to form free hydrogen chloride and the tertiary olefin corresponding to said alkyl chloride, said temperature being substantially below the boiling point of said tertiary olefin, passing an inert gas through the mixture of said tertiary alkyl chloride and said alkyl aryl sulfonic acid while it is being so heated, and withdrawing a mixture of said inert gas and said free hydrogen chloride.

3. The method which comprises heating a mixture of a tertiary alkyl chloride and an alkyl aryl sulfonic acid catalyst at a temperature sufficiently high to effect decomposition of said alkyl chloride to form free hydrogen chloride and the tertiary olefin corresponding to said alkyl chloride, distilling from the reaction mixture the free hydrogen chloride and tertiary olefin, condensing the tertiary olefin from admixture with the free hydrogen chloride, and withdrawing the residual gaseous hydrogen chloride fraction.

4. The method which comprises heating a mixture of a tertiary alkyl chloride and a keryl aryl sulfonic acid catalyst at a temperature sufficiently high to effect decomposition of said alkyl chloride to form free hydrogen chloride and the tertiary olefin corresponding to said alkyl chloride, and separating said hydrogen chloride from said olefin.

5. The method which comprises heating a mixture of a tertiary alkyl chloride and keryl benzene sulfonic acid as a catalyst at a temperature sufficiently high to effect decomposition of said alkyl chloride to form free hydrogen chloride and the tertiary olefin corresponding to said alkyl chloride, and separating said hydrogen chloride from said olefin.

6. The method which comprises heating a mixture of 2-chloro 2,4,4-trimethylpentane and an alkyl aryl sulfonic acid catalyst at a temperature sufficiently high to effect decomposition of said 2-chloro 2,4,4-trimethylpentane to form free hydrogen chloride and diisobutylene, and separating said hydrogen chloride from said diisobutylene.

7. The method which comprises heating a mixture of 2-chloro 2,4,4-trimethylpentane and a keryl aryl sulfonic acid catalyst at a temperature sufficiently high to effect decomposition of said 2-chloro 2,4,4-trimethylpentane to form free hydrogen chloride and diisobutylene, and separating said hydrogen chloride from said diisobutylene.

8. The method which comprises heating a mixture of 2-chloro 2,4,4-trimethylpentane and keryl benzene sulfonic acid as a catalyst at a temperature sufficiently elevated to effect decomposition of said 2-chloro 2,4,4-trimethylpentane to form free hydrogen chloride and diisobutylene, and separating said hydrogen chloride from said diisobutylene.

9. The method which comprises contacting a gaseous by-product stream containing hydrogen chloride with a tertiary olefin in the presence of an alkyl aryl sulfonic acid catalyst under conditions effecting reaction of the hydrogen chloride content of said stream with said olefin to form the corresponding tertiary alkyl chloride, and subsequently decomposing said tertiary alkyl chloride by heating a mixture of said tertiary alkyl chloride and an alkyl aryl sulfonic acid catalyst at a temperature sufficiently high to effect decomposition of said tertiary alkyl chloride and thereby regenerating said hydrogen chloride and said olefin, and separating said hydrogen chloride from said olefin.

10. The method which comprises contacting a gaseous by-product stream containing hydrogen chloride with a tertiary olefin in the presence of an alkyl aryl sulfonic acid catalyst under conditions effecting reaction of the hydrogen chloride content of said stream with said olefin to form the corresponding tertiary alkyl chloride, subsequently passing an inert gas through a liquid mixture of said tertiary alkyl chloride and an alkyl aryl sulfonic acid heated to a temperature sufficiently elevated to effect decomposition of said tertiary alkyl chloride, said temperature being substantially below the boiling point of said tertiary olefin, and withdrawing the resulting mixture of said inert gas and free hydrogen chloride.

11. The method which comprises contacting a gaseous by-product stream containing hydrogen chloride with a tertiary olefin in the presence of an alkyl aryl sulfonic acid catalyst under conditions effecting reaction of the hydrogen chloride content of said stream with said olefin to form the corresponding tertiary alkyl chloride, subsequently decomposing said tertiary alkyl chloride by heating a mixture of said tertiary alkyl chloride and an alkyl aryl sulfonic acid catalyst at a temperature sufficiently high to effect decomposition of said tertiary alkyl chloride into free hydrogen chloride and tertiary olefin, distilling from the mixture the regenerated hydrogen chloride and the tertiary olefin, condensing the tertiary olefin from the overhead vapors, and withdrawing the residual gaseous hydrogen chloride fraction.

12. The method which comprises contacting a gaseous by-product stream containing hydrogen chloride with a tertiary olefin in the presence of a keryl aryl sulfonic acid catalyst under conditions effecting reaction of the hydrogen chloride content of said stream with said olefin to form the corresponding tertiary alkyl chloride, and subsequently decomposing said tertiary alkyl chloride by heating a mixture of said tertiary alkyl chloride and a keryl aryl sulfonic catalyst and thereby regenerating said hydrogen and said olefin, and separating said hydrogen chloride from said olefin.

13. The method which comprises contacting a gaseous by-product stream containing hydrogen chloride with a tertiary olefin in the presence of keryl benzene sulfonic acid as a catalyst under conditions effecting reaction of the hydrogen chloride content of said stream with said olefin to form the corresponding tertiary alkyl chloride, and subsequently decomposing said tertiary alkyl chloride by heating a mixture of said tertiary alkyl chloride and keryl benzene sulfonic acid as a catalyst, and thereby regenerating said hydrogen chloride and the olefin corresponding to said alkyl chloride, and separating said hydrogen chloride from said olefin.

14. The method which comprises contacting a gaseous by-product stream containing hydrogen chloride with diisobutylene in the presence of keryl benzene sulfonic acid as a catalyst under conditions effecting reaction of the hydrogen chloride content of said stream with said diisobutylene to form 2-chloro 2,4,4-trimethylpentane, and subsequently decomposing said 2-chloro 2,4,4-trimethylpentane by heating a mixture of said 2-chloro 2,4,4-trimethylpentane and keryl benzene sulfonic acid as a catalyst and thereby regenerating said hydrogen chloride and diisobutylene, and separating said hydrogen chloride from said diisobutylene.

15. The method of storing and regenerating hydrogen chloride which comprises contacting a gaseous stream of hydrogen chloride with diisobutylene in the presence of keryl benzene sulfonic acid as a catalyst to form 2-chloro 2,4,4-trimethylpentane, neutralizing the said catalyst with a base to render the said 2-chloro 2,4,4-trimethylpentane stable during storage, subsequently providing the said catalyst again in the said 2-chloro 2,4,4-trimethylpentane, and heating the resulting mixture of 2-chloro 2,4,4-trimethylpentane and keryl benzene sulfonic acid to regenerate said hydrogen chloride and diisobutylene, and separating said hydrogen chloride from said diisobutylene.

16. A product, from which hydrogen chloride can be generated at will by addition of acid and heating, comprising a tertiary alkyl chloride which is an addition product of hydrogen chloride and a tertiary olefin, containing a neutralized catalyst which is an alkyl aryl sulfonic acid.

17. A product from which hydrogen chloride can be generated at will by addition of acid and heating, comprising a tertiary alkyl chloride which is an addition product of hydrogen chloride and a tertiary olefin, containing an organic amine salt of keryl benzene sulfonic acid.

18. A product from which hydrogen chloride can be generated at will by addition of acid and heating, comprising 2-chloro 2,4,4-trimethylpentane, containing an organic amine salt of keryl benzene sulfonic acid.

HAROLD RANDOLPH CHIPMAN.

No references cited.